(12) United States Patent
Otsuki et al.

(10) Patent No.: US 6,870,289 B1
(45) Date of Patent: Mar. 22, 2005

(54) DYNAMIC-PRESSURE BEARING AND SPINDLE MOTOR COMPRISING THE SAME

(75) Inventors: Makoto Otsuki, Itami (JP); Osamu Komura, Itami (JP); Kaoru Murabe, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/720,671

(22) PCT Filed: Apr. 28, 2000

(86) PCT No.: PCT/JP00/02829

§ 371 (c)(1),
(2), (4) Date: Feb. 20, 2001

(87) PCT Pub. No.: WO00/66902

PCT Pub. Date: Nov. 9, 2000

(30) Foreign Application Priority Data

Apr. 30, 1999 (JP) .......................... 11-124232

(51) Int. Cl.⁷ ................................. H02K 5/12
(52) U.S. Cl. ......................... 310/90; 310/91
(58) Field of Search ..................... 310/90, 91

(56) References Cited

U.S. PATENT DOCUMENTS 5,559,382 A 9/1996 Oku et al.
6,034,454 A * 3/2000 Ichiyama .................. 310/90
6,121,703 A * 9/2000 Kloeppel .................. 310/90

FOREIGN PATENT DOCUMENTS

| JP | 58-92516 | 6/1983 |
| JP | 59-68716 | 4/1984 |
| JP | 11-69715 | 3/1999 |

* cited by examiner

Primary Examiner—Thomas M. Dougherty
Assistant Examiner—Iraj A. Mohandesi
(74) Attorney, Agent, or Firm—McDermott, Will & Emery

(57) ABSTRACT

A bearing having a high thrust rigidity, an excellent vibration resistance, and a simple structure, as well as a spindle motor using such a bearing are provided. A groove or grooves 7 are disposed to either one of a shaft 2 and a sleeve 3 which form a radial bearing portion, to thereby exert thrust force in a direction which brings two mutually facing members at a thrust bearing portion closer to each other. The groove 7 is inclined with respect to an axis, and the inclination exerts, between the shaft 2 and the sleeve 3, thrust force in a thrust direction. The groove 7 may be herringbone-shaped or other type of groove which can generates such thrust force. It is also possible to further enhance the thrust force utilizing a negative pressure, with an upstream side of the radial bearing portion for introducing fluid such as air shielded from outside air.

7 Claims, 3 Drawing Sheets

DYNAMIC-PRESSURE BEARING AND SPINDLE MOTOR COMPRISING THE SAME

FIELD OF THE INVENTION

The present invention relates to a hydrodynamic bearing and a spindle motor comprising the same. Such a spindle motor is used as a driving source for a magnetic recording apparatus such as a hard disk, or a bar code scanner, and the like.

BACKGROUND OF THE INVENTION

Important characteristics for a bearing of a spindle motor used for magnetic recording apparatus such as a hard disk, or a bar code scanner, etc. are wear and abrasion resistance, vibration resistance, stability of rotation, and the like. Particularly, when rotating members and fixed members of the bearing contact with each other due to vibration, rotation of the spindle motor becomes unstable, which in turn seriously influences reliability and durability of the bearing. In order to avoid this, a technology for enhancing the thrust rigidity of a bearing is in demand.

FIG. 6 shows a hydrodynamic bearing disclosed in Japanese Patent Kokai (A) Publication No. 69715/1999, which could be one of solutions for the above problem. In FIG. 6, a shaft 12 is fixed to a housing 11. A cylindrical member 13 with a closed end on one side is fitted on an outer circumferential surface of the shaft 12 such that the cylindrical member 13 freely rotates. These two members form a bearing. A so called herringbone-shaped groove is formed on the outer circumferential surface of the shaft 12.

A rotor magnet 15 is attached to an outer periphery of the cylindrical member 13, and a stator 14 which forms an electromagnet is attached to the housing 11 so as to face the rotor magnet 15. As a coil wound around the stator 14 is energized, attraction/repellence force is developed between the stator 14 and the rotor magnet 15, which in turn drives the spindle motor. With the cylindrical member 13 rotating due to the driving force, relative motion between the outer circumferential surface of the shaft 12 and a facing inner circumferential surface of the cylindrical member 13 (i.e., radial bearing portion) is developed, which generates a radial hydrodynamic pressure. Air is introduced by an effect of the herringbone-shaped groove formed on the outer circumferential surface of the shaft 12, and is guided to the area between the closed end of the cylindrical member 13 and an upper surface of the shaft 12 (i.e., thrust bearing portion), and applies a pressure. As a result, the cylindrical member 13 is lifted up relative to the shaft 12.

A ring-shaped thrust member 16 is disposed to an outer circumferential portion of the cylindrical member 13, while a thrust retaining member 17 is disposed to the housing 11 at a position opposed to the thrust member 16. As the cylindrical member 13 is lifted up, the thrust member 16 moves closer to the thrust retaining member 17, and a thrust hydrodynamic pressure is generated between the two. This thrust hydrodynamic pressure balances with the pressure generated at the thrust bearing portion, whereby the bearing rotates stably in a non-contact condition.

However, in the case of the hydrodynamic bearing disclosed in Japanese Patent kokai (A) Publication No. 69715/1999, it is difficult to accurately adjust the squareness of the thrust member 16 and a gap with the thrust retaining member 17 after the cylindrical member 13 is inserted during assembly process. Further, since the thrust member 16 and the thrust retaining member 17 are additionally disposed, the structure becomes more complex, larger and heavier.

The purpose of the present invention is, therefore, to provide a bearing which solves the problem as described above, and which can be assembled into a simple structure with a high thrust rigidity and can obtain stable rotation.

SUMMARY OF THE INVENTION

According to the present invention, a groove or grooves are formed on either an outer circumferential surface of a shaft or an inner circumferential surface of a sleeve, and the groove develops a thrust force to cause the gap between the two members facing each other at the thrust bearing portion narrower, to thereby solve the problem mentioned in the above. Specifically, the present invention includes the following.

That is, one aspect of the present invention is a hydrodynamic bearing comprising: a shaft; a sleeve being fitted on an outer circumferential surface of the shaft such that the sleeve freely rotates relative to the shaft; and a thrust plate being directly or indirectly attached to or integrated with either one of the shaft and said sleeve, and the thrust plate being faced with a plane perpendicular to an axis which is formed at one end of the other one of the shaft and the sleeve, wherein hydrodynamic pressure in a radial direction is generated between an outer circumferential surface of the shaft and an inner circumferential surface of the sleeve (hereinafter referred to as "radial bearing portion"), and hydrodynamic pressure in a thrust direction is generated between the thrust plate and the plane perpendicular to said axis which is formed at said one end of the other member and is faced with the thrust plate (hereinafter referred to as "thrust bearing portion"), and the hydrodynamic bearing is characterized in that either one surface forming the radial bearing portion is provided with a groove or grooves for generating a thrust force in a direction making the two facing members at the thrust bearing portion closer to each other, and that either one of the surfaces facing each other at the thrust bearing portion is provided with a groove or grooves for generating hydrodynamic pressure in the thrust direction.

Another aspect of the hydrodynamic bearing according to the present invention is characterized in that the groove formed in the radial bearing portion is a groove inclined with respect to the axis of the bearing or a herringbone-shaped groove.

Yet another aspect of the hydrodynamic bearing according to the present invention is characterized in that the upstream side of the radial bearing portion is shielded against outside atmosphere, and utilizing resultant negative pressure in the vicinity of the upstream of the radial bearing portion for enhancing the force in a direction urging the members forming the thrust bearing portion toward each other.

Yet another aspect of the hydrodynamic bearing according to the present invention is characterized in that the radial bearing portion connected with outside atmosphere and the thrust bearing portion connected with outside atmosphere are formed contiguous to each other, and utilizing gas introduced at the radial bearing portion as a thrust pressure at the thrust bearing portion so as to eliminate the groove for generating the hydrodynamic pressure at the thrust bearing portion.

Still another aspect of the hydrodynamic bearing according to the present invention is characterized in that the hydrodynamic bearing is a shaft rotation type.

Further covered in the present invention is a spindle motor which comprises a hydrodynamic bearing according to the present invention.

In the radial bearing portion, urging force is developed in a thrust direction which reduces a gap between the members forming the thrust bearing portion, and the urging force balances with the thrust pressure generated at the thrust bearing portion. This creates an effect that the thrust rigidity of the bearing is enhanced and a variation in thrust position is reduced. Hence, a hydrodynamic bearing according to the present invention is excellent in that the thrust rigidity is high, the resistant against vibration is strong, and the structure is simple and in turn easy to assemble.

By utilizing the negative pressure generated as a result of shielding the radial bearing portion, it is possible to further intensify the force in the thrust direction to reduce the gap in the thrust bearing portion.

In addition, as air introduced at the radial bearing portion is guided to the thrust bearing portion connected with the radial bearing portion, and preferably discharged to outside, it is possible to eliminate a process of forming a groove for generating the thrust hydrodynamic pressure in the thrust bearing portion by utilizing the pressure induced by the introduced air.

DETAILED DESCRIPTION OF THE PREFERRED EMBODIMENTS

According to the present invention, a groove or grooves inclined with respect to an axis are formed on one of surfaces defining a radial bearing portion of a hydrodynamic bearing, which is either an outer circumferential surface of a shaft or an inner circumferential surface of a sleeve. Alternatively, a groove or grooves of a different type having a similar effect could be formed, as described later. Due to the effect of the groove, a thrust force which moves either one of the shaft and the sleeve axially relative to the other is developed. By utilizing the thrust force and thereby urging mutually facing members at a thrust bearing portion toward each other, stable bearing rotation is realized. The thrust bearing portion is structured to generate hydrodynamic pressure sufficient enough to surpass this thrust force, so that the bearing can rotate in a non-contact condition. More specifically, a groove or grooves for generating a thrust hydrodynamic pressure are formed on a surface of either one of the members facing each other at the thrust bearing portion. Alternatively, air may be guided from the radial bearing portion to the thrust bearing portion, thereby using the air as a pressure to keep the thrust bearing portion in a non-contact condition.

Figure 1:
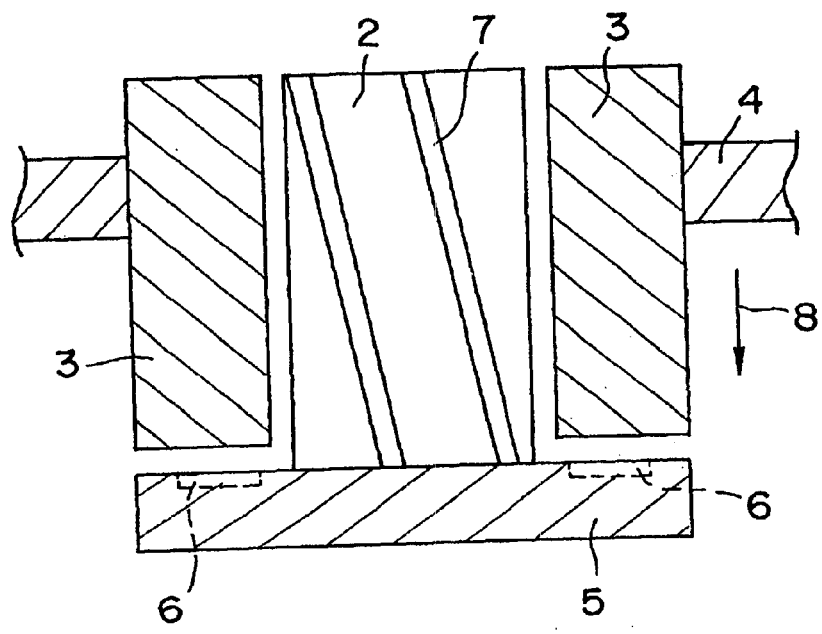
FIG. 1 is a cross sectional view of a hydrodynamic bearing according to a preferred embodiment of the present invention.

The first preferred embodiment of the present invention will be described by referring to the associated drawing. FIG. 1 shows a cross section of a bearing according to the first preferred embodiment. In FIG. 1, a sleeve 3 is fitted on a column-like shaft 2 in such a manner as the sleeve 3 can rotate relative to the shaft 2. A rotor 4 (only a portion thereof is shown in FIG. 1) is attached to the sleeve 3. In the structure shown in FIG. 1, the sleeve 3 and the rotor 4 rotate about the shaft 2. A thrust plate 5 is fixed to one end of the shaft 2, and a hydrodynamic-pressure groove(s) 6 denoted by the dotted line for generating a thrust hydrodynamic pressure is formed on an end surface of the sleeve 3 facing the thrust plate 5. A groove or grooves 7 inclined with respect to an axis are formed on an outer circumferential surface of the shaft 2. The groove 7 is faced with an inner circumferential surface of the sleeve 3.

With respect to an operation of the bearing structured as described in the above, rotational drive force is developed between a rotor magnet (not shown in FIG. 1) attached to the rotor 4 and a stator (not shown in FIG. 1) disposed on a fixed member, and the rotational drive force causes the rotor 4 and the sleeve 3 to rotate about the shaft 2. Due to relative rotation between the outer circumferential surface of the shaft 2 and the inner circumferential surface of the sleeve 3, a radial hydrodynamic pressure is developed between the two. On the other hand, due to relative rotation of the sleeve 3 and the thrust plate 5, a thrust hydrodynamic pressure is generated by the effect of the hydrodynamic-pressure groove (s) 6 of the thrust plate 5. As the result of both the radial hydrodynamic pressure and the thrust hydrodynamic pressure, the rotor 4 and the sleeve 3 rotate in non-contact condition against the shaft 2 and the thrust plate 5.

As described in the above, the groove 7 inclined with respect to the axis is formed on the outer circumferential surface of the shaft 2. According to the first preferred embodiment shown in the FIG. 1, the sleeve 3 is structured so as to rotate counter-clockwise as viewed from the top. Further, the groove 7 is formed to run at an angle from the upper left-hand side toward the lower right-hand side on the front surface shown in FIG. 1. When the sleeve 3 is in rotation, because of the inclined groove 7, fluid such as air existing between the outer circumferential surface of the shaft 2 and the inner circumferential surface of the sleeve 3 flows from the upper left-hand side toward the lower right-hand side in FIG. 1, due to viscosity of the fluid. The flow of the fluid and the viscosity of the fluid develop thrust force to the sleeve 3, which urges the sleeve 3 downwardly against the thrust plate 5 as denoted by an arrow 8 in the drawing. This can be easily understood as screwing the sleeve 3 counter-clockwise into a left-hand screw defined along the groove 7 formed on the shaft 2.

The thrust force urges the sleeve 3 against the thrust plate 5, whereby a gap in the thrust bearing portion is reduced. As described in the above, the hydrodynamic-pressure groove (s) 6 is formed in the thrust plate 5 and the thrust hydrodynamic pressure is therefore generated. The thrust hydrodynamic pressure balances with the thrust force, and the sleeve 3 and the thrust plate 5 consequently rotate close to each other in a non-contact condition, which in turn generates a high hydrodynamic pressure and enhances the rigidity of the thrust bearing portion.

Although the foregoing has described that the radial groove 7 is formed on the outer circumferential surface of the shaft 2, the groove 7 may be formed on the inner circumferential surface of the sleeve 3. That is, as in the previous example, the inner circumferential surface of the sleeve 3 may have a left-hand threaded groove so that urging force of the direction shown by the arrow 8 is generated and a similar effect to the above can be achieved.

As the groove 7 is formed, fluid such as air is sucked at an upper part of the radial bearing portion in FIG. 1 and flows downwardly along the inclined groove 7. Therefore, in the case of the bearing having the structure shown in FIG. 1 wherein the radial bearing portion and the thrust bearing portion are contiguous to each other, the fluid flowing passed the radial bearing portion streams into the thrust bearing portion. As a result of this, the fluid contained to the thrust bearing portion acts as a pressure to pull the members forming the thrust bearing portion apart from each other, and hence, it may be possible to obtain enough thrust pressure even if the hydrodynamic-pressure groove 6 on the thrust plate 5 is eliminated. It would be more effective if this is realized.

When the groove 7 is disposed to the sleeve 3, even if the groove is equally left-hand threaded, air is sucked from the lower part of FIG. 1 (thrust bearing portion) and is guided upwardly and discharged from the upper part of the radial bearing portion. Accordingly, a pressure as mentioned in the above to pull apart the thrust bearing portion is not created, and hence, the hydrodynamic-pressure groove 6 can not be eliminated in this case.

Although the hydrodynamic-pressure groove 6 of the thrust bearing portion is formed in the thrust plate 5 in the above preferred embodiment, the hydrodynamic-pressure groove 6 may be disposed to a bottom end surface of the sleeve 3 which is faced with the thrust plate 5.

Figure 2:
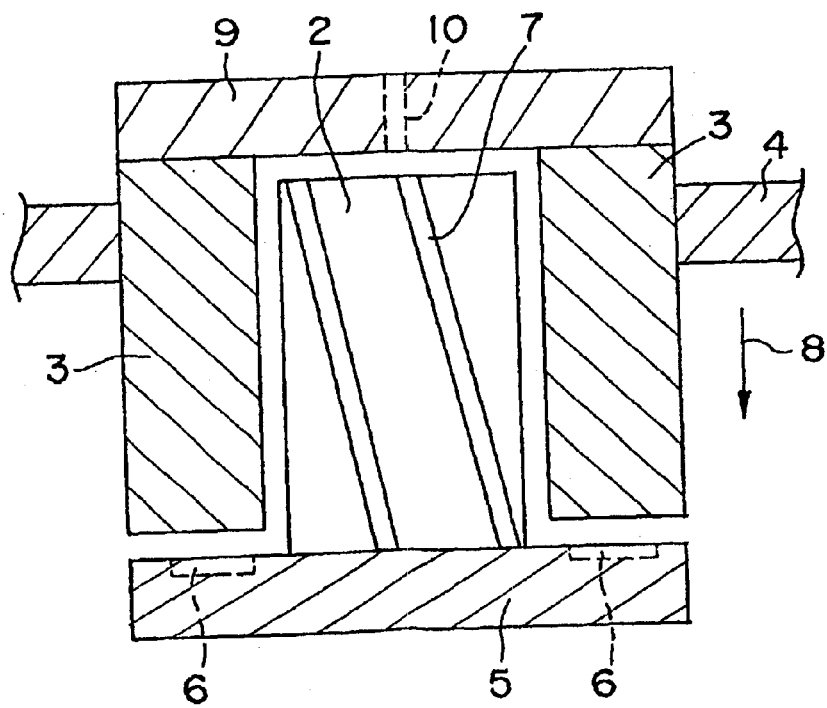
FIG. 2 is a cross sectional view of a hydrodynamic bearing according to another preferred embodiment of the present invention.

Now, the second preferred embodiment of the present invention will be described by referring to the associated drawing. FIG. 2 shows a cross section of a bearing according to the second preferred embodiment. In FIG. 2, the like elements as in FIG. 1 bear the like reference numerals. According to the second preferred embodiment, a cover 9 for shielding an upper part of the shaft 2 from outside air is disposed above the sleeve 3 in FIG. 2. The direction in which the rotor 4 and the sleeve 3 rotate is the counter-clockwise direction as in the case of the first preferred embodiment.

In the hydrodynamic bearing structured as described in the above, as the sleeve 3 rotates, fluid, such as air, flows in the radial bearing portion along the groove 7 of the shaft 2 from the upper part to the lower part in FIG. 2, as described earlier. However, since the upper part of the sleeve 3 is sealed off with the cover 9, the flow of the fluid generates a negative pressure in the vicinity of the cover 9. Suction force induced by this negative pressure intensifies the urging force denoted by the arrow 8. Since the hydrodynamic-pressure groove 6 develops a thrust hydrodynamic pressure surpassing this suction force at the thrust bearing portion, it is possible to obtain stable rotation with the thrust bearing portion keeping non-contact condition and maintaining the gap therein narrow.

In the second preferred embodiment as well, a groove 7 may be formed on the inner circumferential surface of the sleeve 3. In such a case, as the sleeve 3 rotates, fluid is guided in the radial bearing portion from the lower part to the upper part in FIG. 1, and further, toward the thrust bearing portion which is connected with the radial bearing portion. However, since that thrust bearing portion is shielded with the cover 9, the fluid is compressed in the vicinity of the cover 9, which in turn may lead to an undesired air-cushion effect. By forming an opening 10 as denoted by the dotted line in the cover 9, the air-cushion effect may be avoided even in such a case.

Further, in the second preferred embodiment as well, the groove for generating a hydrodynamic pressure at the thrust bearing portion may be formed in the bottom end surface of the sleeve 3 which is faced with the thrust plate 5, instead of on the thrust plate 5.

Figure 3:
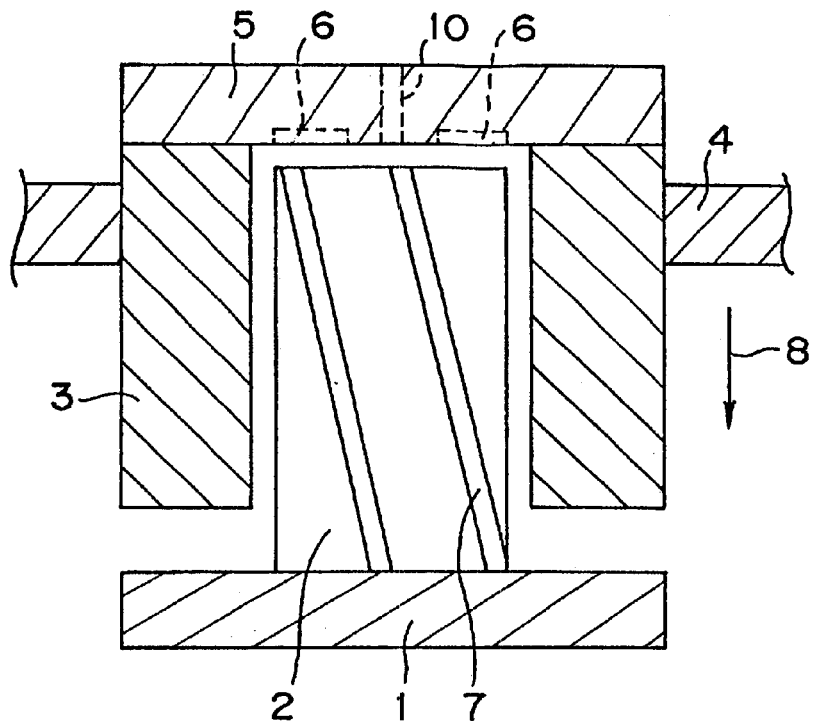
FIG. 3 is a cross sectional view of a hydrodynamic bearing according to yet another preferred embodiment of the present invention.

Now, the third preferred embodiment of the present invention will be described by referring to the associated drawing. FIG. 3 shows a cross section of a bearing according to the third preferred embodiment. In FIG. 3, the like elements as in FIG. 2 bear the like reference numerals. Further, the direction in which the sleeve 3 rotates is also the counter-clockwise direction. In FIG. 3, the shaft 2 is fixed to the housing 1. The thrust plate 5 is fixed to an end surface of the sleeve 3, covering a top end of the shaft 2 with the sleeve 3 fitted on the shaft 2 for free rotation. The hydrodynamic-pressure groove 6 is formed on the surface of the thrust plate 5 which is opposed to a top end surface of the shaft 2.

In the hydrodynamic bearing structured as described in the above, as the sleeve 3 rotates, fluid flows in the radial bearing portion along the groove 7 of the shaft 2 from the upper part to the lower part in FIG. 3. However, since the upper part is shielded by the thrust plate 5 from outside atmosphere, a negative pressure is generated in the vicinity of the thrust plate 5. This negative pressure generates thrust force which presses down the sleeve 3 along the arrow 8, thereby reducing a gap of the thrust bearing portion between the thrust plate 5 and the top end surface of the shaft 2. The thrust bearing portion is structured so as to generate a thrust hydrodynamic pressure surpassing this thrust force by the effect of the hydrodynamic-pressure groove 6. As As denoted by the dotted line, the opening 10 may be formed in the thrust plate 5, so that outside air may be introduced into the thrust bearing portion through it. In this case, the negative pressure effect described above would not be developed. However, the screw effect due to the groove 7 formed on the outer circumferential surface of the shaft 2 remains effective. Therefore, a force pressing down the sleeve 3 along the arrow 8 serves to make the gap of the thrust bearing portion narrower.

In the third preferred embodiment as well, the groove 7 may be formed on the inner circumferential surface of the sleeve 3. That is, the inner circumferential surface of the sleeve 3 may be left-hand threaded, so that urging thrust force similar to the above along the direction of the arrow 8 is generated. In this case, fluid running along the groove is guided in the radial bearing portion from the lower part to the upper part in FIG. 3. By forming the opening 10 denoted by the dotted line, the fluid is discharged to outside through the thrust bearing portion connected with the radial bearing portion, after the fluid flows passed the radial bearing portion. Since a pressure which lifts up the thrust plate 5 and the sleeve 3 from the top end portion of the shaft 2 is generated at the thrust bearing portion, it may be possible to eliminate the thrust hydrodynamic-pressure groove in this case. It would be more effective, if this is realized.

Although the hydrodynamic-pressure groove 6 of the thrust bearing portion is formed on the thrust plate 5 in this preferred embodiment above, the hydrodynamic-pressure groove 6 may be formed on the top end surface of the shaft 2 which is faced with the thrust plate 5.

Figure 4:
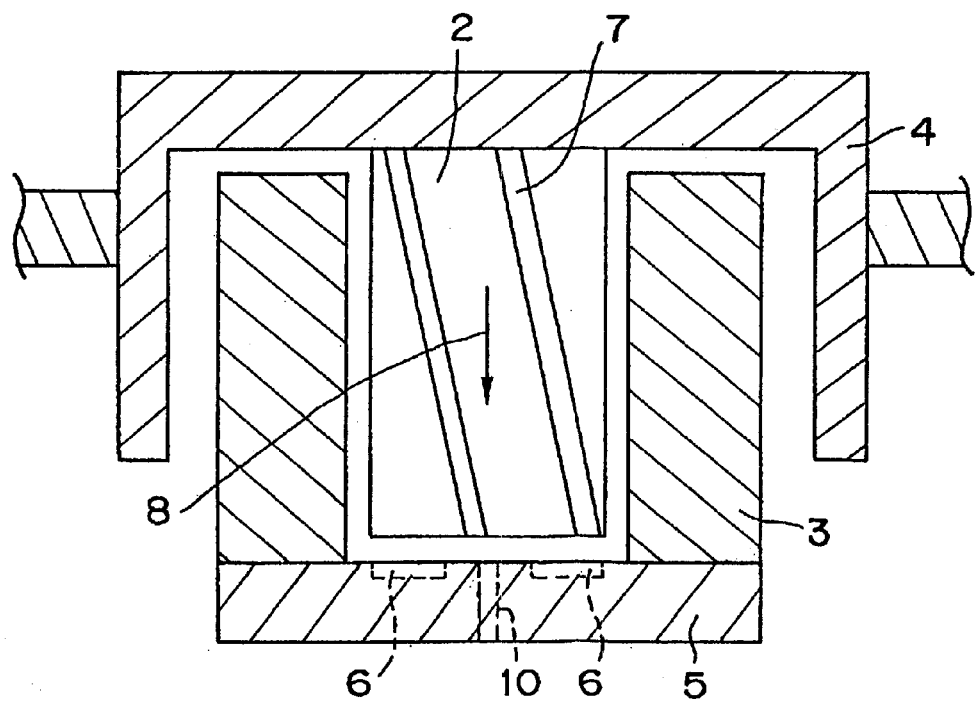
FIG. 4 is a cross sectional view of a hydrodynamic bearing according to yet another preferred embodiment of the present invention.

Now, the fourth preferred embodiment of the present invention will be described by referring to the associated drawing. FIG. 4 shows a cross section of a bearing according to the fourth preferred embodiment, wherein the shaft 2 rotates unlike in the first through the third preferred embodiments in which case require the sleeve 3 to rotate. In FIG. 4, the like elements as in FIGS. 1 through 3 bear the like reference numerals. In FIG. 4, the thrust plate 5 is attached to the sleeve 3. The hydrodynamic-pressure groove 6 for generating a thrust hydrodynamic pressure is formed on the thrust plate 5. The shaft 2 having the groove 7 on the outer circumferential surface is fitted on the sleeve 3 for free rotation. The rotor 4 is fixed to the shaft 2, which allows the shaft 2 and the rotor 4 to rotate about the sleeve 3. The direction in which the shaft 2 and the rotor 4 rotate is the counterclockwise direction as viewed from top, as in the precedent preferred embodiments.

In the hydrodynamic bearing structured as described in the above, as the shaft 2 rotates, fluid flows from a lower portion toward an upper portion in FIG. 4 along the groove 7. However, since the lower portion is shielded by the thrust plate 5 from outside atmosphere, a negative pressure is generated in the vicinity of the thrust plate 5. Suction force of the negative pressure generates force which presses down the shaft 2 along the arrow 8, thereby reducing a gap of the thrust bearing portion between the thrust plate 5 and the bottom end surface of the shaft 2. The thrust bearing portion is structured so as to generate a thrust hydrodynamic pressure surpassing the above generated force by the effect of the hydrodynamic-pressure groove 6. Further, due to a screwing effect created by the groove 7 formed in a left-hand screw manner, a force presses down the shaft 2 toward the thrust plate 5 is added.

As denoted by the dotted line, an opening 10 may be formed in the thrust plate 6 to thereby introduce outside air. In this case, while the effect caused by the negative pressure described above is not valid, the screw effect due to the groove 7 formed on the outer circumferential surface of the shaft 2 remains effective, which allows the force pressing down the shaft 2 as denoted by the arrow 8 to function, and hence, brings the gap of the thrust bearing portion closer.

In this structure as well, the groove 7 may be formed on the inner circumferential surface of the sleeve 3, instead of forming the groove 7 on the outer circumferential surface of the shaft 2. That is, the inner circumferential surface of the sleeve 3 may be left-hand threaded, so that urging force along the arrow 8 similar to the above is generated. In this case, the fluid flowing along the groove is introduced at the upper part of the radial bearing portion and guided toward the lower part of the radial bearing portion in FIG. 4. By forming an opening 10 denoted by the dotted line, after the fluid flows passed the radial bearing portion, the fluid is discharged to outside through the thrust bearing portion connected with the radial bearing portion. With the diameter of the opening 10 appropriately selected, the pressure of the fluid generates force which lifts up the shaft 2 and the rotor 4 with respect to the thrust plate 5, and therefore, the thrust hydrodynamic-pressure groove may be eliminated. It would be more effective if this is realized.

In the fourth preferred embodiment as well, as in the precedent embodiments, the hydrodynamic-pressure groove 6 of the thrust bearing portion formed in the thrust plate 5 may be formed on the opposing bottom end surface of the shaft 2.

Figure 5:
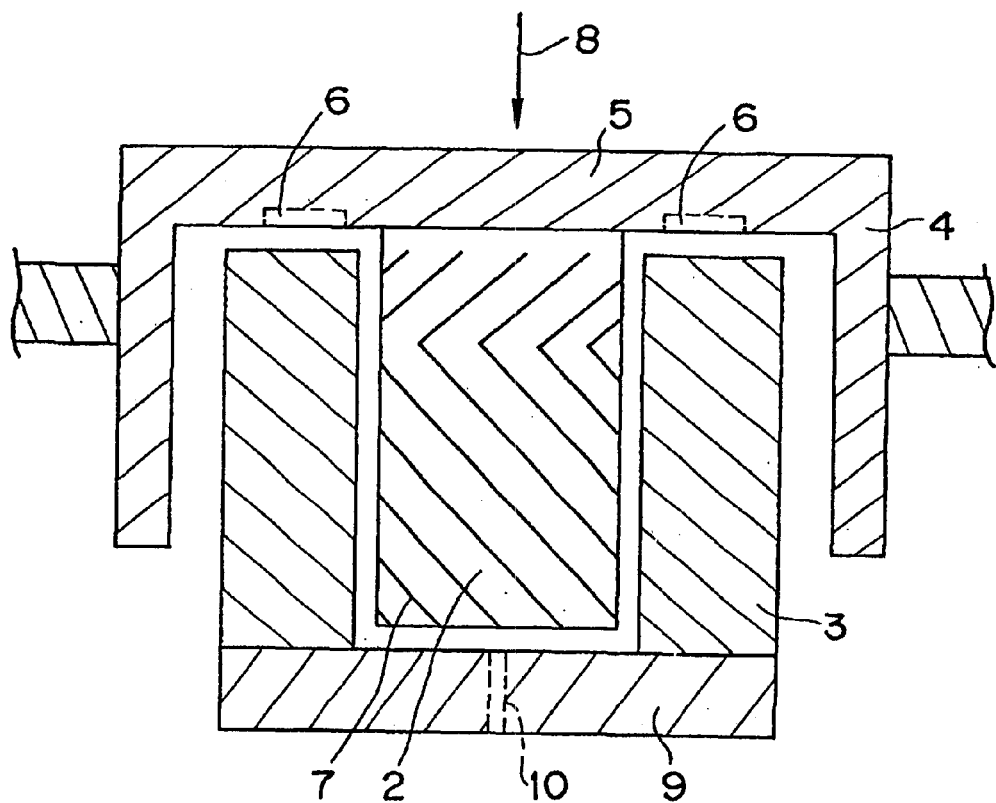
FIG. 5 is a cross sectional view of a hydrodynamic bearing according to still another preferred embodiment of the present invention.

Now, the fifth preferred embodiment of the present invention will be described by referring to the associated drawing. FIG. 5 shows a cross section of a bearing according to the fifth preferred embodiment. Although it is structured that the shaft 2 rotates relative to the sleeve 3, this is different from the fourth preferred embodiment in that the thrust bearing portion is disposed in an upper part of the bearing in FIG. 5. In FIG. 5, the like elements as in FIGS. 1 through 4 bear the like reference numerals. Further, the direction in which the shaft 2 rotates is the counter-clockwise direction, as in the case of precedent preferred embodiments.

In the fifth preferred embodiment, the groove 7 disposed to the shaft 2 is a so-called herringbone-shaped groove, rather than an inclined groove as described in the other embodiments. An inclined groove and a herringbone-shaped groove are interchangeable with each other in all of the preferred embodiments. A herringbone-shaped groove is normally grooves which are inclined in two different directions, and defines a mountain-shaped apex at a portion where the two grooves meet each other. In FIG. 5, the location of the mountain-shaped apex is deviated from the axial center of the bearing portion. With respect to suction effect of fluid in the groove 7 formed in such a manner, a part of the groove occupying wider span in the axial direction demonstrates superior sucking effect to the other part of the groove. In short, in FIG. 5, the effect of the part of the groove formed in the left-hand screw direction at a lower axial part is superior. Hence, as the shaft 2 rotates counter-clockwise, the shaft 2 exerts urging force along the direction of the arrow 8 over the sleeve 3, thereby creating force of a direction which makes the gap of the thrust bearing portion narrower.

While the respective preferred embodiments of the present invention relate to the examples of an inclined groove and a herringbone-shaped groove, the groove may have other shape, such as a wave-like shape or a hook-like shape, so far as the groove subjects the shaft 2 and the sleeve 3 to a thrust effect relative to each other in a direction pressing one of the both thrust bearing members toward the other, and the groove having any other such shape would fall within the scope of the present invention.

In the hydrodynamic bearing structured as described in the above, just like the precedent preferred embodiments exemplified before, the rotation of the shaft 2 generates a negative pressure in the vicinity of the lower portion of the shaft 2 which is shielded from outside air. Suction force induced by the negative pressure develops thrust force which presses down the shaft 2 along the arrow 8. Further, the left-hand screw effect of the herringbone-shaped groove similarly generates a force which presses down the shaft 2. At the thrust bearing portion, the hydrodynamic-pressure groove 6 generates a thrust hydrodynamic pressure surpassing these forces. Where the opening 10 denoted by the dotted line is disposed, the negative pressure effect described above is not generated. However, the downward pressing force along the arrow 8 due to the screw effect remains effective, whereby the gap at the thrust bearing portion is narrowed.

The effect achieved by disposing the opening 10 resides in that an simplification can be realized by eliminating the hydrodynamic-pressure groove 6, due to the effect of the fluid sucked through the opening 10. The fluid sucked through the opening 10 flows to the radial bearing portion along the groove 7 and then to the thrust bearing portion connected with the radial bearing portion, and thereby generates the thrust fluid pressure which lifts up the thrust plate 5 from the top end surface of the sleeve 3.

In this structure as well, the groove 7 may be formed on the inner circumferential surface of the sleeve 3, rather than forming on the outer circumferential surface of the shaft 2, to thereby generate downward pressing force along the arrow 8 similar to the above. In this case, air running along the groove 7 is introduced at the upper part of the thrust bearing portion and guided to the lower part of the radial bearing portion as viewed in the drawing, and therefore, an undesired air-cushion effect is created. With the opening 10 described above disposed, it is possible to avoid this cushion effect.

Although the hydrodynamic pressure generating groove 6 of the thrust bearing portion is formed in the thrust plate 5 in the fifth preferred embodiment as well, the groove may be formed on the top end surface of the sleeve 3 opposing to the thrust plate 5.

In each one of the preferred embodiments above, fluid such as air is used to develop a hydrodynamic pressure at the bearing. The fluid herein referred to includes other gases for creating a particular atmosphere, such as inert gas and nitrogen gas, as well as liquids such as oil.

PRACTICAL EXAMPLE 1

A performance was evaluated for the sleeve-rotation type bearing structured as shown in FIG. 1.

Conditions were, rotor weight: 100 g, rotation speed: 12,000 rpm, and the clearance: 4 µm. These conditions remain the same for the other examples shown below.

The dimensions of the respective portions were, diameter of the radial bearing: 15 mm, length of the radial bearing: 20 mm, and diameter of the thrust plate: 23 mm.

The result of the evaluation for this example:

Property 1: Ratio of relative assembly time was 120 (with excellent squareness of the axis end and the sleeve end).

Property 2: Excellent rotation capability. Contact occurred at 5 G.

PRACTICAL EXAMPLE 2

A performance was evaluated for the sleeve-rotation type bearing structured as shown in FIG. 3.

The dimensions of the radial bearing portion were, diameter: 15 mm, and length: 20 mm.

Property 1: Ratio of relative assembly time was 120 (with excellent squareness of the axis end and the sleeve end)

Property 2: Excellent rotation capability. Contact occurred at 10 G.

PRACTICAL EXAMPLE 3

A performance was evaluated for the shaft-rotation type bearing structured as shown in FIG. 4.

The dimensions of the radial bearing portion were, diameter: 15 mm, and length: 20 mm.

Property 1: Ratio of relative assembly time was 100 (with excellent squareness of the axis end and the sleeve end)

Property 2: Excellent rotation capability. Contact occurred at 9 G.

PRACTICAL EXAMPLE 4

A performance was evaluated for the shaft-rotation type bearing structured as shown in FIG. 5.

The dimensions of the radial bearing portion were, diameter: 15 mm, and length: 20 mm.

Property 1: Ratio of relative assembly time was 100 (with excellent squareness of the axis end and the sleeve end)

Property 2: Excellent rotation capability. Contact occurred at 6 G.

COMPARISON EXAMPLE

Figure 6:
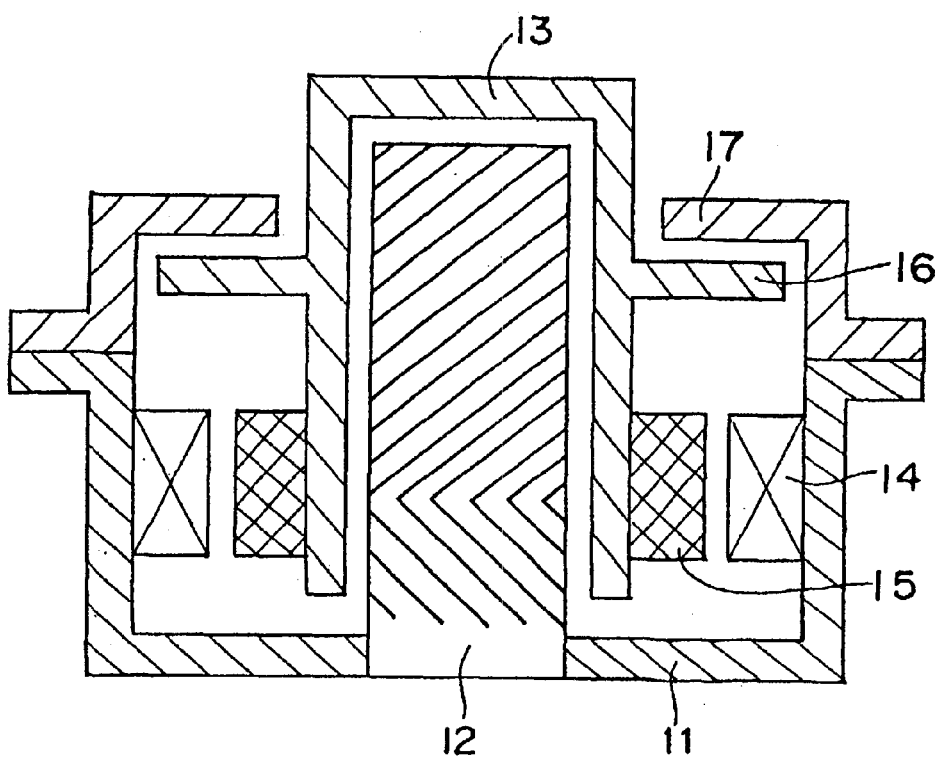
FIG. 6 is a cross sectional view of a spindle motor which uses a conventional hydrodynamic bearing.

A performance was evaluated for the conventional shaft-rotation type bearing with closed axis end structured as shown in FIG. 6.

Property 1: Ratio of relative assembly time was 200 (with difficulty in adjustment)

Property 2: Excellent rotation stability.

What is claimed is:

1. A hydrodynamic bearing, comprising:
a column-like shaft;
a hollow cylindrical sleeve being fitted on an outer circumferential surface of said shaft so as to achieve relative rotation among the two; and
a thrust plate being directly or indirectly attached to or integrated with either one of said shaft and said sleeve, which thrust plate being faced with a plane formed at one end of the other one of said shaft and said sleeve perpendicular to an axis of said bearing,
wherein hydrodynamic pressure in a radial direction being generated at a radial bearing portion formed by an outer circumferential surface of said shaft and an inner circumferential surface of said sleeve, and hydrodynamic pressure in a thrust direction being generated at a thrust bearing portion formed by said thrust plate and said plane which is faced with said thrust plate and formed at said one end of said other member perpendicular to said axis,
the hydrodynamic bearing is characterized in that either one of the surfaces forming said radial bearing portion is provided with a groove or grooves configured to generate a force in a thrust direction via a fluid located in the radial bearing portion so as to cause an axial movement of either one of the shaft and the sleeve through relative rotation therebetween, said relative rotation being in a direction that causes axial movement of the sleeve or the shaft in a direction that reduces a gap between the two facing members at said thrust bearing portion, and
either one of the surfaces of said two facing members at said thrust bearing portion is provided with a groove or grooves which generate hydrodynamic pressure in said thrust direction.

2. The hydrodynamic bearing of claim 1, wherein said groove formed in said radial bearing portion is either a groove inclined with respect to said bearing axis, or a herringbone-shaped groove whose apex is displaced from the center of the groove in the axial direction so as to generate said force in thrust direction when the hydrodynamic bearing is rotated.

3. The hydrodynamic bearing of claim 1, wherein an upstream side of said radial bearing portion is shielded against outside atmosphere, and a resultant negative pressure developed in the vicinity of said upstream side of said radial bearing portion is utilized for enhancing said force in a thrust direction of bringing the two facing members forming said thrust bearing portion closer to each other.

4. The hydrodynamic bearing of claim 1, wherein the radial bearing portion connected with outside atmosphere and the thrust bearing portion connected with outside atmosphere are formed contiguous to each other, and utilize gas introduced at said radial bearing portion for a thrust pressure at said thrust bearing portion, whereby said groove(s) (6) for generating the hydrodynamic pressure at said thrust bearing portion is eliminated.

5. The hydrodynamic bearing of claim 1, wherein the hydrodynamic bearing is structured as a shaft-rotation type.

6. A spindle motor comprising the hydrodynamic bearing of claim 1.

7. A hydrodynamic bearing of claim 1, wherein a through-hole is formed in either said thrust plate or a cover plate covering the sleeve at the opposite side of the thrust plate with respect to the shaft to permit fluid communication between inside of the thrust bearing portion and outside atmosphere, said through-hole is configured to partially or fully eliminate development of a pressure acting against said force in said thrust direction.

* * * * *